US006816762B2

(12) United States Patent
Hensey et al.

(10) Patent No.: US 6,816,762 B2
(45) Date of Patent: Nov. 9, 2004

(54) ELECTRONIC OPERATIONS AND MAINTENANCE LOG AND SYSTEM FOR AN AIRCRAFT

(75) Inventors: Bernard Hensey, Dublin (IE); Stephen Hardgrave, Dublin (IE); Jonathan Brennan, Co. Clare (IE)

(73) Assignee: Flightman Research Limited, Dublin (IE)

( * ) Notice: Subject to any disclaimer, the term of this patent is extended or adjusted under 35 U.S.C. 154(b) by 32 days.

(21) Appl. No.: 10/197,950

(22) Filed: Jul. 17, 2002

(65) Prior Publication Data

US 2003/0109973 A1 Jun. 12, 2003

(30) Foreign Application Priority Data

Jul. 17, 2001 (IE) .......................................... S2001/0666

(51) Int. Cl.[7] .................................................. G06F 7/00

(52) U.S. Cl. ........................................... 701/35; 701/33

(58) Field of Search .............................. 701/29, 33, 34, 701/35, 14; 707/1, 9

(56) References Cited

U.S. PATENT DOCUMENTS

| 5,974,349 | A | 10/1999 | Levine |
| 6,003,808 | A | 12/1999 | Nguyen et al. |
| 6,125,312 | A | 9/2000 | Nguyen et al. |
| 6,232,874 | B1 * | 5/2001 | Murphy ................. 340/426.19 |
| 6,243,628 | B1 | 6/2001 | Bliley et al. |
| 6,278,913 | B1 | 8/2001 | Jiang |
| 2002/0165647 | A1 | 11/2002 | Glenn, III et al. |

* cited by examiner

Primary Examiner—Yonel Beaulieu
(74) Attorney, Agent, or Firm—Jackson Walker, LLP

(57) ABSTRACT

An aircraft data collection device directed at solving problems associated with the completion and return of aircraft operational data and/or technical log data. The device is for use by a plurality of users, each of the users having associated security level. The device has a security means for identifying a user and determining their associated security level, a user interface to obtain operational and/or technical data associated with an aircraft flight cycle, from one or more of the plurality of users. Each item of data has an associated security level, wherein the user interface only accepts an item of data from a user when the authorisation level of the user at least matches the authorisation level of the item of data.

27 Claims, 6 Drawing Sheets

ELECTRONIC OPERATIONS AND MAINTENANCE LOG AND SYSTEM FOR AN AIRCRAFT

FIELD OF THE INVENTION

This invention relates to the field of aircraft operations and maintenance and in particular to the use of technical logs and/or flight operational information and/or flight crew information to maintain a flight and/or maintenance and/or flight crew history for an aircraft and/or aircraft operator.

BACKGROUND OF THE INVENTION

Globally, it is estimated that commercial aircraft operators spend nearly U.S. $400 billion per year on operating expenses. There are clear economic reasons, for aircraft operators interested in operational efficiency, to attempt to minimise the cost of fleet maintenance, vendor costs, fuel consumption, crew costs, airport fees and other costs, and to optimise the potential of using any means whereby overall operating expenses may be minimised.

There are four groups of players in the aviation industry:

Aircraft Operators. These include commercial passenger airlines, a sector that can be sub-divided into two broad categories: full service airlines and specialist service providers (such as the low cost airlines or corporate travel specialists). The other two major categories of aircraft operators are freight carriers and national defence forces.

Original Equipment Manufacturers (OEMs). There are four main categories of OEM: Airframes (principally, Boeing and Airbus); Engines (principally, GE, Pratt & Whitney, and Rolls Royce); Avionics (such as Honeywell, Raytheon, Rockwell Collins, etc.); and Components (such as Allied Signal, Hamilton Sundstrand, BF Goodrich, etc.).

Maintenance Repair and Overhaul (MRO) Providers. There are two main categories of MRO companies: Independents such as FLS Aerospace that provide MRO services to aircraft operators but where the aircraft operator has no proprietary interest in the MRO company, and in-house companies where the principal customer owns the MRO company (e.g. Lufthansa Technik). The MRO sector can also be sub-divided as to the breadth of service offered. Most major MRO companies strive to provide a comprehensive set of services so that an aircraft operator can transfer its complete maintenance operation to the MRO company or select a suite of desired services. Other MRO players specialise in specific MRO activities such as engine overhaul.

Third Parties. These include Governments (through their continued ownership of airlines), Regulators, Airports, and Independent Service Providers.

The outsourcing of non-core activities by aircraft operators continues to be a key strategy in an ever more competitive market. Most major aircraft operators now outsource heavy maintenance services to independent MRO's, but continue to perform light maintenance in-house. The main reason cited for not outsourcing the complete maintenance cycle is that labour unions prevent it. For this reason aircraft operator owned capacity remains a significant factor in the MRO sector and these owners are seeking to increase their level of 3rd party service provision in order to improve profitability.

The other major reason why aircraft operators are reluctant to outsource all of their maintenance activities is the fear of losing control of information regarding their fleets. Aircraft operator profitability is determined by aircraft utilisation: filling seats with revenue generating payloads and keeping aircraft in the air by minimising maintenance time. So, when an aircraft operator hands its aircraft over to an MRO company it is effectively handing over control of a key profit driver to a third party. (There is also a regulatory imperative on aircraft operators to 'manage' the maintenance of their fleets).

Only a few leading aircraft operators have managed to turn their MRO operations into sustainable businesses (e.g. Lufthansa and Air France), although profitability has been marginal at best. All of the major U.S. carriers provided full service MRO to third parties during the 1980s but comparatively few have remained in this business.

There are three core business streams in aviation MRO namely:

Airframe, Engine, Avionics, and Component Overhaul
Line Maintenance and Aircraft Control
Component Management Overhaul, or heavy maintenance is carried out at MRO hanger facilities. The aircraft is taken out of operation and delivered to the hangar by the aircraft operator. Typically, many activities are then outsourced to third parties such as specialist engine repair shops (who will often further outsource specific engine parts to other specialist outfits). Put simply, the objective is to overhaul the aircraft and get it back into service as quickly as possible.

Line Maintenance and Aircraft Control (Maintrol) is the light maintenance service performed while the aircraft is in operation. It needs to be carried out at all the destination airports flown to by an aircraft operator (including its hub airport). Maintrol activities consist of recording cycles flown, monitoring engine and airframe condition, and replacing components. The key objective of maintrol is to ensure that the aircraft makes its next scheduled take-off.

Component Management is the activity that ensures that an aircraft operator carries the most economically efficient inventory of spare parts. It is a logistical operation designed to ensure that parts will be available at airports when an aircraft needs a part replaced.

The crucial skill in performing all of these MRO activities is not technical competence (as this is a mandated standard) but the ability to share information and co-ordinate activities. Clearly, the process is a distributed activity (overhaul is outsourced along the MRO industry supply chain) and maintrol services are provided at remote airport locations. When an aircraft is in a hangar, the turnaround time can be affected by the performance of the smallest supplier in the chain. When an aircraft is on the ground at an airport, it may have to remain at the airport until the required spare part can be sourced. The upshot of this situation is a disruption to flight schedules and the associated problems that are well known in the industry. Delays can therefore prove very costly not just in a monetary sense, but also with respect to the public perception of the airline.

In comparison to the design and manufacture of airframes, engines and components, the aviation MRO sector is 'low-tech'. MRO is carried out by a process of dismantling, assessing, repairing and/or replacing. The parts are then put back where they were found. Every process is carried out strictly according to OEM approved procedures and these procedures are supervised and approved by the various regulatory authorities responsible for air travel safety.

That said, the process of aviation MRO is extremely complex and information-intensive. It involves gathering huge quantities of data, detailed planning, and precise logistical control. The management of this process not only determines the efficiency of MRO companies but also directly affects the bottom line profitability of aircraft operators.

The MRO companies, as well as the OEMs and the aircraft operators currently have a variety of Enterprise Resource Planning (ERP) systems in place to manage the flow of information within their own organisations. However, integration of IT systems between the key players in the industry is almost non-existent. Furthermore, the process of data collection is largely paper based and data input is manual. The source of all maintenance related data is the aircraft. After each landing a Technical Log (a paper form) is completed by a ground engineer and/or a pilot and is signed off by the Captain of the aircraft. These 'tech logs' are then delivered back to the aircraft operator base, conventionally using a returning aircraft, where the details are manually entered into computer systems to generate management reports. Aircraft operators use these reports to manage their fleets and to schedule heavy maintenance checks. When an aircraft is due for a heavy maintenance check, many crates of paper are transferred by aircraft operators to the MRO company, where they are manually entered into the MRO's IT system.

There can be substantial delays in inputting the data (an operator's technical records can be anywhere from several days to several weeks "time late"). There is also a great deal of repeated effort and potential for error in entering the same information several times into different systems. Forms are often so illegible that accurate entries to a system cannot be made based on them. Some forms are lost altogether. When issues arise with the accuracy of the data, generally too much time has passed for a satisfactory solution to be obtained.

Communication between industry players endeavouring to monitor the maintenance of aircraft or to source spare parts is still primarily carried out by telephone and fax. Although efforts are being made to update communication systems, progress is slow.

A significant area of the overall process involving paper transactions is that of aircraft technical and operations logs. Typically the data collected spans a number of functional areas, including fuel and load calculations, performance calculations, weight and balance calculations and defect records. The necessity for aircraft operators to complete and return paper records for each flight is time consuming, labour intensive, complicated and can lead to errors. In addition, from a maintenance perspective, the current procedures for returning and entering aircraft technical and/or operational log data can lead to delays in responding to required actions and the possible grounding of aircraft for failure to fix simple faults in time.

Accordingly, there is a need for an improved system of collecting aircraft technical log data and/or general aircraft operational data.

SUMMARY OF THE INVENTION

The invention provides a device that contains electronic versions of an operator's existing forms and/or forms beyond the content of conventional forms, including a host of value-added functions as described herein. The device is adapted to link via one or more of a plurality of communication mediums to a server to transmit and receive data and provides an internet-accessible user interface (remote access) that may be used to access and update data stored on the server-side and/or the client-side. The device is preferably rugged, portable and hand held, but may be of any electronic form.

In a first embodiment, the invention provides an aircraft data collection device for use by a plurality of users, each of the users having an associated security level. The data collection device (a remote electronic device) comprising:

a security means for identifying a user and determining their associated security level, a user interface means adapted to obtain technical and/or operational data associated with an aircraft flight cycle, from one or more of the plurality of users, each item of technical and/or operational data having an associated security level, wherein the user interface means is adapted to only accept an item of data from a user when the authorisation level of the user at least matches the authorisation level of the item of technical and/or operational data.

Using this arrangement, only persons having a suitable authorisation can enter and/or view and/or update and/or delete data in the appropriate fields of the forms accessible on the device, which is an important requirement for regulatory reasons.

The data collection device may further comprise communication means for communicating entered aircraft technical and/or operational data to an external datastore (for example a remote server).

The communication means may comprise a wire and/or wireless connection terminal for connecting to a network to enable entered aircraft technical and/or operational data to be uploaded to a datastore on a remote server.

The communication means may also comprise a memory reader, e.g. a floppy disk drive, adapted to receive a memory device, e.g. a floppy disk. In addition to or instead of this, the communications means may comprise a flash card, "dongle" (a small electronic data storage device, similar in size and appearance to a car alarm control, that typically connects to a computer through a USB port), or other removable data storage device upon which the entered aircraft technical and/or operational data may be stored.

The user interface may be further adapted to display data previously entered by users and/or data received via the communications means. In this situation, the user interface may be further adapted to only display data to users having a security or user level associated with the data to be displayed.

In a further embodiment, an authorisation means may be provided which is adapted to prevent the upload of data to the server until data has been entered for a number of pre-determined sections.

In a further embodiment, the authorisation means may be adapted to enforce process workflow, such as preventing entry of data corresponding to a subsequent aircraft cycle until entered aircraft data associated with the previous cycle has been saved locally on the device and/or transmitted to an external datastore. The logical intuitive process flow can be adapted to mirror the existing aircraft paper-based operation, but also expand on existing functions, creating added value for customers.

In another embodiment, the user interface may contain list menus, which are populated with items appropriate to the individual fields. Preferably, the menus may be populated automatically by reference to a data store. In this way, the system may be updated simply by updating the database without the need to re-code menus.

In a further embodiment, the user interface may comprise a first series of list menus which are populated with items identifying systems of an aircraft which may be selected by a user and wherein upon selection of a system of an aircraft, the user is presented with a subsequent list menu identifying a list of predetermined problems associated with the selected system of the aircraft. Optionally, fields for typed entries may also be provided.

The user interface means optionally comprises a defect reporting system, the defect reporting system comprising:

a menu generation means for generating a hierarchical series of menus, a user selection means for accepting a user selection from each of the series of menus, a datastore containing an aircraft parts definition wherein each part of the definition is either a sub-part or contains one or more sub-parts, wherein upon receipt of a selection from the user input means, the menu generation means generates a menu containing a list of parts of the definition which are identified in the datastore as sub-parts of the user selection.

In a further embodiment of the user interface, the datastore also contains possible faults, each part not having a sub-part being associated with one or more possible faults and wherein upon selection by a user of a part from a menu which has no sub-parts stored on the database, the menu generation means generates a menu comprising a list of possible faults associated with the selected part. Preferably, the datastore associates a code with each part and possible fault. In this case, the user selection means generates an output identifying the part and fault by their respective codes. The part may be identified by its code and/or the code of the part of which it is a subpart.

The invention further provides a method of collecting aircraft data from a plurality of users, each of the users having an associated security level, the method comprising:

identifying a user and determining the user's associated security level, obtaining technical and/or operational data associated with an aircraft flight cycle, from the user, each item of technical and/or operational data having an associated security level, wherein the step of obtaining technical and/or operational data from the user is performed only when the user has an authorisation level at least matching the authorisation level of the item of technical and/or operational data.

Using this method, only persons having a suitable authorisation can enter data in the appropriate fields of the relevant forms, which is an important requirement for regulatory reasons.

The method of collecting aircraft data may further comprise the step of communicating entered aircraft technical and/or operational data to an external datastore.

The step of communicating entered aircraft technical and/or operational data to an external datastore may comprise connecting to a network and uploading entered aircraft technical and/or operational data to a datastore on a remote server.

The step of communicating entered aircraft technical and/or operational data to an external datastore may comprise storing the aircraft technical and/or operational data on a data storage device, e.g. a floppy disk, flash card, dongle, or other data storage device.

The method may further comprise the displaying of data previously entered by users and/or data received. In this situation, displayed data may be restricted to users having a security level associated with the data to be displayed.

In a further embodiment, the step of uploading of data to the server may be prevented until data has been entered for a number of pre-determined sections and/or conditions.

Furthermore, the entering of data corresponding to a subsequent aircraft cycle may be prevented until entered aircraft data associated with the previous cycle has been transmitted to an external datastore or device or until data has been copied onto dongle and/or other removable data storage device.

In a further embodiment, the method may include the provision of a user interface comprising a first series of list menus which may be populated with items identifying sections or systems of an aircraft which may be selected by a user and wherein upon selection of a section or system of an aircraft, the user is presented with a subsequent list menu identifying a list of predetermined problems associable with the selected section or system of the aircraft.

The step of providing the user interface may further comprise a method of defect reporting comprising generating a menu in a hierarchical series of menus from a datastore containing an aircraft parts definition wherein each part of the definition is either a sub-part or contains one or more sub-parts, upon receipt of a selection from the user, the generated menu containing a list of parts of the definition which are identified in the datastore as sub-parts of the user selection.

The method of providing a user interface may comprise the step of storing possible faults in the datastore, and associating faults with and wherein upon selection by a user of a part from a menu which has no sub-parts stored on the datastore, generating a menu comprising a list of possible faults associated with the selected part.

The method may also comprise the step of associating a code with each part and possible fault, wherein the generation of data concerning a part fault identifies the part and fault by their respective codes. The part may be identified by its code and/or the code of the part of which it is a subpart or by some similar convention.

The Invention creates a host of benefits and advantages, not least of which being the improvement of business processes, and the building of efficiencies in a number of key areas. The various advantages and embodiments will be described in the detailed description which follows.

BRIEF DESCRIPTION OF THE DRAWINGS

The invention will now be described in greater detail with reference to the accompanying drawings in which.

DETAILED DESCRIPTION OF THE INVENTION

Figure 1:
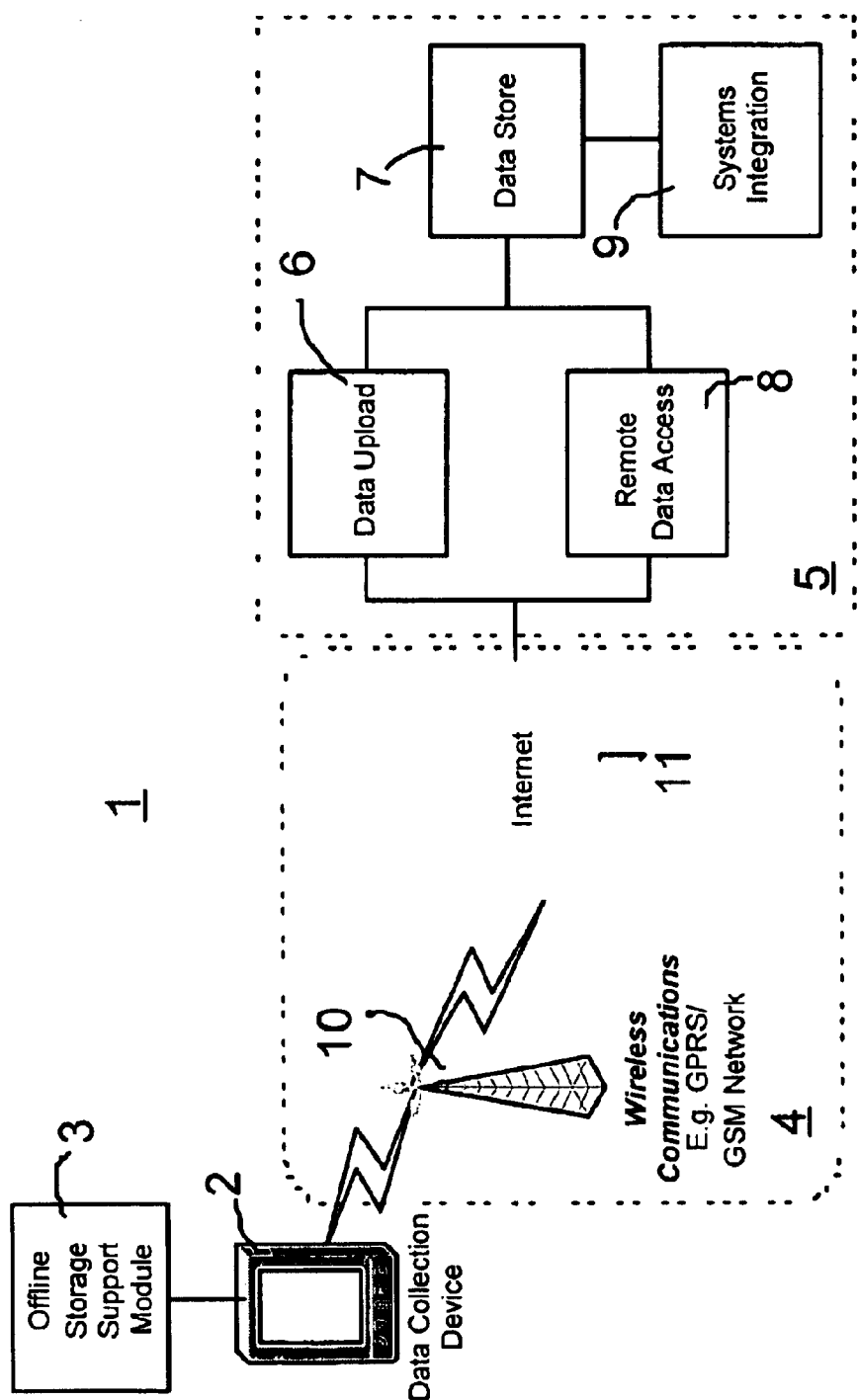
FIG. 1 is an overview of a block diagram of a system according to the invention.

A number of tables are contained within in this document. It will be appreciated that these tables are mere representations of exemplary types of data that may be included and are not intended to be limiting. The overall system 1 of the invention, as shown in FIG. 1, comprises a data collection device having an associated off-line storage support module 3, and means for communication via one or more suitable communications networks 4 to a system server 5. The off-line storage support module is, in essence, a software module on the data collection device, having associated files. The system server 5 comprises a data upload and retrieval 6 module allowing data to be uploaded from the data collection device 2 and stored on a server data store 7. The server data store 7 acts as a repository for all information collected by flight and ground crew personnel about the operation and maintenance of aircraft. The system server may also comprise a remote data access module 8 permitting the data collection device 2 to access/retrieve data stored on the server data store 7.

Optionally, a systems integration module 9 may be provided to facilitate interaction between the system of the invention and other aircraft management systems. By implementing an electronic system whereby, for example, the ERP systems of the various players are to some degree integrated with the system of the invention, the benefits of shared information may be optimised. For example, in the endeavour to monitor the maintenance of aircraft and/or to source spare parts, it may be desirable that the relevant members of the supply chain have access to the required information, which is not possible within the existing paper based systems.

The purpose of the data collection device 2 is to facilitate the collection of aircraft flight and maintenance information from both flight and ground crew personnel. It effectively replaces the current paper based aircraft technical and/or operational log and defect reporting paper forms. Additionally it facilitates the integration of a number of other value-added functions (e.g. validation, performance calculations, recording of vendor information, enhanced security measures, reduction of potential margin of error) into the electronic data collection process. The data collection device 2 may primarily be used to collect data entered by two sets of users, i.e. Aircraft flight crew and Aircraft maintenance ground crew, although other sets of users may be allowed, for example Fuel bowser operators, Line maintenance providers, Caterers, Parts suppliers, Baggage handlers etc. Each user may be associated with a security level. Different users in the same set may have different security levels associated with them. For example, the Captain of an aircraft may have a higher security level than a co-pilot or flight engineer.

The data collection device 2 is preferably a personal computer (PC)—most likely in a tablet or laptop configuration—or PDA (personal digital assistant) or similar device running a suitable operating system. A PDA is a term for a mobile hand-held device that provides computing and information storage and retrieval capabilities for personal or business use. An example of a suitable device and operating system would be a Fujitsu Stylistic LPT-600 tablet PC running Windows 2000, or a Fujitsu PenCentra 200 hand held PC from Fujitsu running Windows HPC, although there are numerous variations. Mobile phones having PDA functionality are one option as they provide an integrated communications device.

The data collection device of the invention is suitably adapted to provide a user interface, predominantly menu based. The user interface is intended to be an electronic representation of the current paper based aircraft technical log and general flight operations forms. By maintaining similarity with the existing paper based forms, it is believed that the requirements for approval and training will not be as extensive as otherwise might occur albeit perhaps not the most efficient for data entry and software design purposes.

However, the interface is not limited to being an electronic representation and alternative representations may be developed. Similarly, additional forms beyond the content of conventional forms may be created/provided, which expand on the content of current paper-based forms, including a host of value-added functions as described herein.

A major advantage provided by the invention is the ability to supply accurate information in a timely and reliable manner. The accuracy is obtained from a variety of factors including the use of a digital data collection process. Using combo boxes and menus for known choices further reduces the margin for human field entry error. As a result of the conversion from a paper-based system, data entry is required only once, thus eliminating the need for multiple entry, which tends to be very error-prone, and also reducing associated labour costs and time delays.

Similarly, problems with legibility or lack thereof are no longer an issue as all data entry is performed using a digital input device (e.g. keyboard or virtual keyboard).

A further significant advantage is that aircraft related information is provided during the turnaround period, normally within minutes of an aircraft landing. Similarly, the use of a computing device for data collection means that calculations can be performed on-board. For example, by entering figures in the appropriate fields or selecting values from a pre-determined list of values, performance calculations, unit conversions, time calculations and/or other mathematical operations may be performed, and forwarded to necessary parties during a turnaround cycle.

Parts expediting costs may be reduced. For example, as data is entered onto the server much quicker than the multiple entry paper-based method, required parts may be ordered earlier and therefore delivered in a timely manner, thereby eliminating the need for expensive last-minute parts transportation costs.

Flight hour driven costs may be improved. (These may include, among other things: crew costs; aircraft, engine and component leases; "power by the hour maintenance contracts" etc.). Lost segments may be reduced and aircraft utilisation improved.

In terms of reliability, the aircraft information can be guaranteed to reach the intended recipients. There are no lost forms. If required, a system whereby each form must be digitally signed and verified may be used to ensure that the source of the information transmitted is reliable. A system whereby forms cannot be completed or submitted if blank fields exist within them may be implemented, again depending on user requirements. On submitting information from the device to the server, an acceptance system may be used to verify that information has reached its destination successfully. If an event occurs whereby information cannot be transmitted via the Internet connection for any reason, the removable storage device backup system (again described herein) may be utilised.

A host of value-added functions may be incorporated into the Invention as outlined in the sections below.

Aircraft take off and landing performance calculations can be executed on-board during the turnaround cycle and sent to the server within a few moments of landing.

Weight and Balance Calculations can also be performed on-board prior to departure. These calculations are dependent on a large number of inputs, from which the Centre of Gravity for actual zero fuel weight, actual take-off weight and actual landing weight are calculated. These three points may then be plotted on an Index versus Weight graph to verify that the aircraft is controllable throughout the flight.

The invention supports the flexweight program operated by many airlines. Flex weight data can be recorded automatically on the server. Data captured may include the Gross Weight, Flight number, out/off/on/in and tail number. The captured flex weight data may then be analysed and reports may be generated based on the analysis, with the summarising of data into a final report format (as required by Eurocontrol, the Federal Aviation Administration/Authority (FAA), the Civil Aviation Authority (CAA) and Boeing). The application may be structured so that last minute changes can be made quickly and easily and the results calculated. This may include changes to the actual aircraft configuration or the load of the aircraft such as passengers (PAX), fuel or cargo. In one embodiment, the application may generate a graph which is in line with the IATA standard way of presenting weight and balance information of an aircraft.

Vendor Management is an important value-added function that is facilitated by the Invention. For example, by maintaining electronic records of fuel, airport services, and other airline/vendor transactions, costs may again be more easily reconciled. By keeping accurate digital records of purchases and sales, incorporating for example inventory management, currency conversions and pricing systems, there is substantial room to create added value for customers in this area.

Expanding on one of the above areas as an example, fuel management is an area which historically presents a major problem in terms of reconciling costs which are often difficult to pin down. The sheer quantity of fuelling transactions has historically made it very difficult for airlines to reconcile the costs that their internal systems calculate. They should pay versus actual invoices received from vendors. By improving the business processes to include the electronic collection of data on fuel quantities and costs for each aircraft, at each airport, every day, airline costs may be more easily tracked and reconciled.

Fuel records, (for example fuel load calculations and conversions, broken down by vendor if necessary), can be better managed and more accurately entered by using the data collection process enabled by the Invention. It is also easier to maintain accurate fuel-burn measurement records. Overall, stricter compliance with fuel plans is made possible and the process of fuel costs reconciliation may be greatly simplified.

In another embodiment, the invention provides the technology for the conversion of paper-based technical and/or operational manuals and documentation to electronic format, which may be installed on the remote device. These electronic versions of all manner of manuals may be created, viewed or edited at any stage. For example, the display engine may be required to store and display technical and/or operational manuals, checklists, maintenance manuals and/or Minimum Equipment Lists (MEL) manuals. The Invention may allow for each of these to be accessed and/or updated at any stage. Updates may be communicated from the data collection device to the server Help text or on-line help may be provided on the data collection device for information on dealing with each electronic form and also to assist with troubleshooting.

Web-based training may be provided to give instruction on use of the invention. The content may be tailored to the various user groups, for example pilots, maintenance engineers, flight crew and ground crew. The training may be task-based.

Using the Client/Server model, with Internet technology, a wide range of external systems may be linked to the server of the invention. For example XML data may be exported to existing Airline ERP systems or XML may be used to link data in any number of different ERP systems. In addition, airline staff, contractors, partners, suppliers or other relevant parties may access information on aircraft status stored on the server, retrieve reports from the server, analyse trends based on information stored on the server-side or enter updates to the information on the server. Such remote access capability also enables the distribution of key operational, personnel, and customer information internally and with key vendors.

Preferably, the user interface comprises a display engine having an associated series of forms, e.g. Hypertext Mark-up Language (HTML) and/or Extensible Mark-up Language (XML) files, which when viewed on the data collection device represent individual sections of the equivalent paper based aircraft technical log and/or flight operational forms. It will be appreciated that more than one section for entering and/or viewing aircraft data may be included in a single file and concurrently displayed. The mark-up tells the display engine how to display text and images for the user. Each individual mark-up code is referred to as an element (but many people also refer to it as a tag). Some elements come in pairs that indicate when some display effect is to begin and when it is to end. XML is a flexible way to create common information formats and share both the format and the data on the World Wide Web, intranets, and elsewhere. For example, computer makers might agree on a standard or common way to describe the information about a computer product (processor speed, memory size, and so forth) and then describe the product information format with XML. Such a standard way of describing data would enable a user to send an intelligent agent (a program) to each computer maker's Web site, gather data, and then make a valid comparison. XML may be used by any individual, group of individuals, or companies, who want to share information in a consistent way.

Additional functionality may be included in the forms, using for example Java Script to provide the additional functionality to the user interface and to make the interface as easy-to-use, easy-to-learn, and efficient as possible, while minimising the margin for human error.

The forms may be stored/generated/shown in hierarchical forms in order to improve the ability to capture all of the required information by the various users of the system.

The data collection/retrieval device 2 will also comprise a suitable communications interface for transmitting and receiving data from the server.

In one embodiment, the communications network 4 comprises the use of General Packet Radio Services (GPRS), whereby a continuous connection to the Internet can be established by mobile phone, PDA and computer users. With GPRS, communication channels are used on a shared-use, as-packets-are-needed basis and data rates of up to 114 Kbps are believed to be achievable. The high data rates allow users to interact at an improved speed with Web sites and similar applications using mobile handheld devices as well as notebook computers.

In another embodiment, the communications network 4 comprises a Global System for Mobile communication (GSM) network 10 in combination with the Internet 11 which may be accessed using an Internet Service Provider (ISP). GSM is a digital mobile telephone system that is widely used in Europe and other parts of the world. GSM uses a variation of time division multiple access (Time Division Multiple Access) and is the most widely used of the three digital wireless telephone technologies (TDMA, GSM, and CDMA). GSM digitizes and compresses data, then sends it down a channel with two other streams of user data, each in its own time slot. It operates at either the 900 MHz/1800 MHz or 1900 MHz frequency band. GSM provides relatively low cost, high availability, feature set, is widely used and deployed, and is easily integrated with data collection devices. Preferably, the GSM network operator selected should provide HSCSD (High Speed Circuit Switched Data), which allows faster information transmission rates (up to 43.2 Kbps, depending on the operator) than conventional CSD (9.6 Kbps).

Other possible communication channels may include, Inmarsat (International Maritime Satellite phone), VDL mode 4 (Very High Frequency Data Link, Mode 4)—a standard for digital communications that provides mobile communications from aircraft-to-aircraft and between aircraft and ground), VDL mode 2 and Bluetooth. Communication may, for example, take place using a TCP/IP connection and the above mentioned are just the physical connections (communications channels).

In a further embodiment, the communications network may comprise the use of Very High Frequency (VHF) range of the radio spectrum. A great deal of satellite communication and broadcasting is done via VHF. Wideband modulation may be used by some services. Channels and sub bands within the VHF portion of the radio spectrum are allocated by the International Telecommunication Union (ITU).

In yet a further embodiment, the communications network may comprise the use of Aircraft Communications and Reporting System (ACARS) which communicates with the ground using a VHF network. The communications network may comprise of public access networks such as GSM and/or GPRS operated networks and/or industry networks.

In respect of the user interface on the data collection device 2, it will be appreciated that different forms will be required for different aircraft types as in the existing paper based systems.

Examples of forms which may be available may include but are not limited to forms to allow user input of:

Login information. This form may, for example, simply consist of fields and/or menus for entry of a username and password or other similar methods for gaining access to the system Flight crew information. This form may contain fields and/or menus for entry and/or selection of the names and positions of individual crew members (See Table 6 for a basic example).

Voyage Reports (See Table 4). This form may contain fields and/or menus for entry and/or selection of details associated with one or more flight legs that may constitute a voyage Fuel & Load Information (See Table 5). This form may contain fields and/or menus for entry and/or selection of details associated with fuel quantities used, fuel burn etc.

Notices to Airmen (NOTAMs), which may be used primarily to obtain and disseminate information regarding unanticipated or temporary changes to runways and airports Airworthiness release details. This form may contain fields and/or menus for entry and/or selection of data, which may be used to assess whether an aircraft is fit to fly Oil and Hydraulics information. This form may contain fields and/or menus for entry and/or selection of details associated with oil usage and flows.

Performance data and calculations. This form may contain fields and/or menus for entry and/or selection of information regarding aspects of aircraft performance at the various flight stages (e.g. takeoff, landing)

Aircraft takeoff, landing and cruising information. This form may contain fields and/or menus for entry and/or selection of information regarding the various stages of a flight Engine and Auxiliary Power Unit (APU). This form may contain fields and/or menus for entry and/or selection of data associated with the powering of the aircraft Exceedences. This form may contain fields and/or menus for entry and/or selection of data concerning a range of parameters, for example whether safe temperatures or speeds have been exceeded.

Aircraft maintenance and defect history. This form may contain fields and/or menus for entry and/or selection of data associated with aircraft maintenance, defects and parts supply.

Weight and balance information and calculations (See Table 8) This form may contain fields and/or menus for entry and/or selection of data associated with, for example, passenger and cargo weights, etc., and graphs may be plotted based on the information entered Ground crew information. This form may contain fields and/or menus for entry of or selection of the names and positions of the crew on the ground Ground Services Information (See Table 7). This form may contain fields and/or menus for entry of or selection of details regarding equipment allocated to each aircraft on arrival Ground crew information equating to Carried Forward Defect Record data Ground crew information approximating to Deferred Defect Log data Ground crew information for Terminal Check Logs Content that may be found on some of the forms named above is illustrated in Tables 4 to 8. It is important to note that the information in these tables is intended only to be indicative and does not necessarily represent the layout or actual full content of the forms.

The associated off-line storage support module 3 allows the data collection device 2 to save the current technical log information and general flight operations information to an off-line storage device in the event that communications with the server are not available. The off-line storage may also be used for maintenance tracking purposes, to retain historical information from the aircraft technical log and associated information on the hand-held device, and for general flight operations tracking, to retain historical information on performance calculations, vendor records (e.g. duty free sales, fuel management, and component management), NOTAM information, financial information and other historical flight information. The minimum period for data retention by the device will be at least one complete month although it is envisioned that longer periods are achievable. The exact duration may be estimated from the volume of information to be archived, the overall storage space and the remaining working resources of the hand-held device. The information is stored in a suitable structure, for efficient access and management (for example in a relational database). This may be secured by implementing user authentication mechanisms.

A removal feature (routine) may be provided to automatically remove historical data from the collection device after a predetermined time so as to prevent data overflow.

Figure 2:
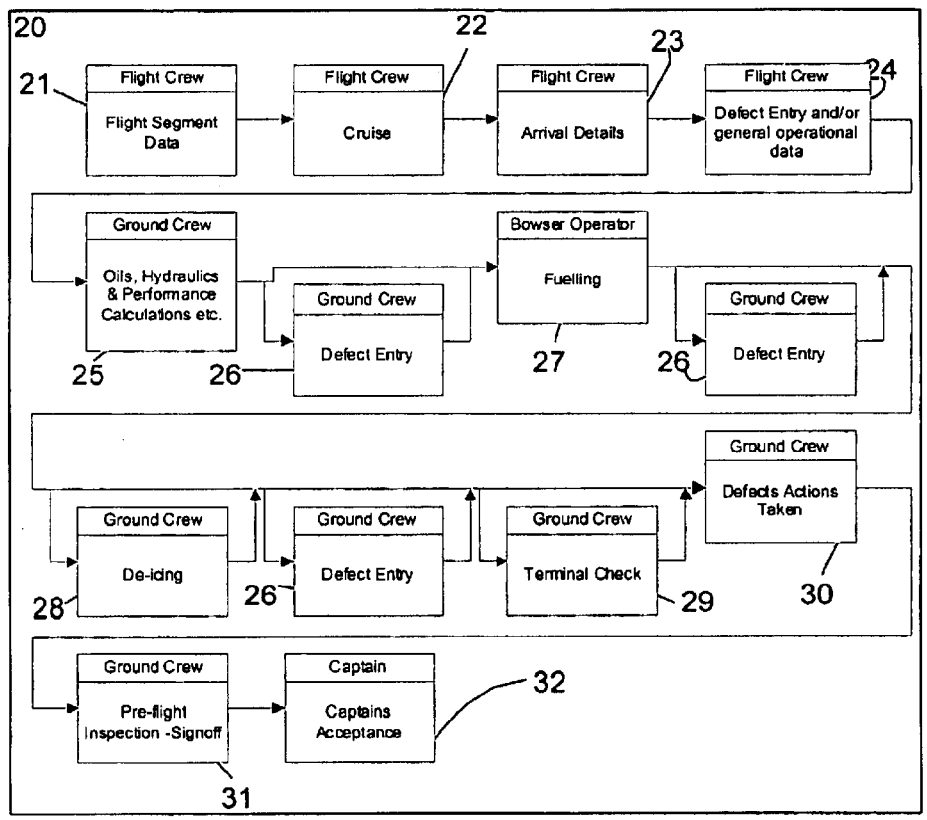
FIG. 2 is an exemplary workflow for use in the invention.

An exemplary workflow 20 illustrating possible inputs from associated users of the data collection device 2, as illustrated in FIG. 2, commences with the input 21 of flight segment data by the flight crew. Subsequently, information may be entered 22, 23 by the flight crew during the flight and then on arrival. The Flight Crew may be required to complete 24 a Defect Entry and/or general operations set of entries in-flight and/or on arrival.

If there are no defects on the aircraft, a defect entry may be created with the entry "NIL" indicating "no defects". The Ground Crew may raise 26 additional Defect Entries at any time during the aircraft's turn-around process.

In FIG. 2, where a work item is by-passed by a solid line, it indicates that the work item is an optional and/or occasional element of the workflow i.e. De-icing 28 etc.

The Oil and Hydraulic and fuel entries 25, 27 are typically mandatory, but a number of other value-added functions can be performed, such as performance calculations and sales calculations, the results of which can be then used to generate a variety of reports.

In accordance with regulations, all defects must be cleared during the Defect Actions Taken process. Any actions taken are entered 30 by a mechanic before the aircraft can be certified as airworthy.

The Terminal Check 29 is not an optional work item, but needs only to be completed at specified intervals.

From the illustration it will be appreciated that different parties (e.g. Flight crew, Ground crew, Bowser operator, Captain) are responsible for entering different aspects.

Each user will instigate a digital signing and storing locally of the captured user data by pressing a "Submit" button. When a form is committed, Java error validation methods or other similar methods may be used to provide data validation on each of the fields contained on the form. If a field has not been completed or has been completed incorrectly, the user may be prompted to correct all error(s) before proceeding. Forms validation is an important feature of the electronic data collection method, which provides a distinct advantage over paper-based recording methods. Forms completed correctly by the user will be stored locally in an upload queue.

The upload queue is responsible for ensuring that data entered by users will be uploaded and stored in the main data store 7.

Conventionally, when a pilot needs to report a problem, for example that the auto throttle is not functioning correctly, they write something like "Auto throttle sticking" into the text field of the defects section of the paper defects form. Different pilots may use different formats for recording a defect. In addition, the quality of handwriting may mean the written description of the problem is difficult to interpret.

Conversion to a computer based input removes the problems associated with intelligibility of handwriting but because different descriptions may be used by different people, the automatic translation of textual data into a centralised data store may prove difficult or even impossible to automate.

Accordingly, in order to make the data entry process simpler and more standardised, the user interface of the present invention may be provided with a defect classification system which allows the precise and consistent descriptions of defects (and actions taken), removes the necessity for flight crew to write a textual description of problems in the defect section of the aircraft technical log and similarly removes the necessity for ground crew to write a textual description of problems in the defect action section of the aircraft technical log.

The defect classification system incorporates the existing standards for describing systems of an aircraft. These include the ATA 100 and ATA iSpec 2200 standards, as well as the Minimum Equipment Lists (MELs) and Maintenance Manuals (MMs) of aerospace Original Equipment Manufacturers and aircraft operators.

An exemplary excerpt is shown below in table 1.

TABLE 1

Excerpt of classification for Autothrottle system

| AREA | SYSTEM | SUB SYSTEM | COMPONENT | CONDITION |
| --- | --- | --- | --- | --- |
| Electrical | Auto Flight | Auto Pilot | Auto Throttle | Inoperable |

Figure 3:
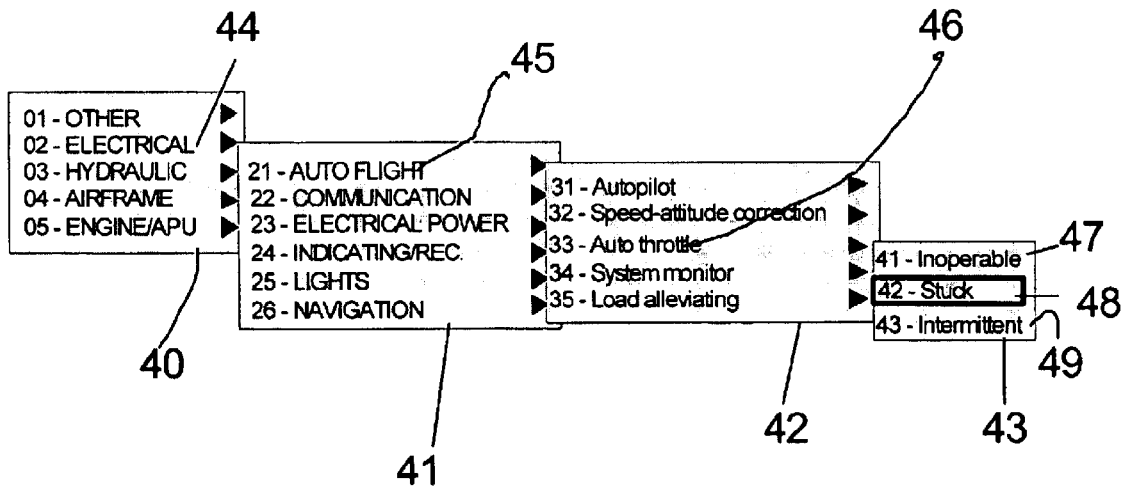
FIG. 3 is an exemplary menu according to the invention.

This standard is incorporated into a series 40, 41, 42, 43 of drop down menus (as illustrated in FIG. 3) on the data collection device 2, illustrated by example in FIG. 3, from which a user may select an area (e.g. electrical 44), a sub-system (if electrical e.g. Auto Flight 45) and a component of the sub system (e.g. Auto throttle 46). The menu system is further expanded to include a series of defects 47, 48, 49 associated with each component. For example, in the case of the Auto throttle, the defect may be that it is inoperable 47, stuck 48 or intermittent 49.

By providing this menu facility to allow the pilot to select the problem from a series of menus or automatically populated drop down lists removes any possible ambiguity from descriptions of defects and also removes the necessity to type a description, making the job of the individual entering the defect easier and the job of the individual who must take action based on the defect easier.

Preferably, the menus may be populated automatically by reference to a database containing an appropriately coded AT-100 standard identifying the aircraft parts along with associated problems for the individual parts. In this way, the system may be updated simply by updating the database without the need to re-code hard coded menus. Techniques for automatically populating a menu scheme from a database and storing resulting selections are well known in the art.

The operation of the defect classification system will now be explained in greater detail with reference to the example defect of "Auto throttle inoperable" described above.

In operation, the person reporting the defect (e.g. the pilot) will activate the defect classification system, which will provide a first menu 40, as illustrated in FIG. 3 identifying the primary areas, in the example shown: navigation, electrical 44, hydraulic, airframe, engine/APU, other.

In the example shown the pilot has first selected the electrical option 44. Upon receipt of this first selection, the defect classification system would generate a second menu 41 corresponding to sub systems of the electrical system, in the example Auto Flight 45, Communication, Electrical Power, Instruments and Lights. In the example shown, the pilot would select the "Auto Flight 45" option from the second menu. Upon receipt of this second selection, the defect classification system would generate a third menu 42 corresponding to components of the auto flight system in the electrical area, in the example Auto Pilot, Speed-attitude correction, Auto Throttle 46, etc. In the example shown, the pilot would select the "Auto Throttle 46" option from the third menu 42. Upon receipt of this third selection, the defect classification system would generate a fourth menu 43 corresponding to defects associated with the auto throttle component, in the example shown inoperable 47, stuck 48, intermittent 49, or other, for which the pilot has in this case selected the "inoperable" option.

In response to the selection of the defect from the menu, the classification system may store the defect as follows: "02-21-33-42" indicating that the problem is,

(02) Electrical,
(21) Auto Flight,
(33) Auto throttle,
(42) Stuck.

This defect information may be easily interpreted by any person or system having knowledge of the coding format used.

The Invention security infrastructure guarantees that messages may pass securely over the public Internet. The application's messaging system fulfils the four basic principles of a secure Internet, namely:

Authentication—Identifying the sender and verifying that the sender is who they say the are Non-repudiation—A digital electronic signature may be used to prevent a signatory from denying that he or she affixed a signature to a specific record, record entry, or document Confidentiality—Keeping the information encrypted and secure Integrity—Ensuring that messages are not interfered with during transmission The same security principles may be applied to the storage of information on a removable storage device (for example a dongle, floppy disk, memory card or other storage device) as with transmitting data across a network. The same encryption and authentication principles and methods may be used if required.

The Joint Aviation Requirements (JAR)-145 regulation requires work on aircraft to be performed by suitably qualified individuals. JAR's are the requirements published by the Joint Aviation Authorities (JAA) in the fields of aircraft design and manufacture, aircraft operations and maintenance, and the licensing of aviation personnel. JAA is an associated body of the European Civil Aviation Conference (ECAC) representing the civil aviation regulatory authorities of a number of European States who have agreed to co-operate in developing and implementing common safety regulatory standards and procedures. This co-operation is intended to provide high and consistent standards of safety and a "level playing-field" for competition in Europe. Much emphasis is also placed on harmonising the JAA regulations with those of the USA. For this reason, a security means is provided in the form of a security module for determining the associated security level for a user. The security module is operative to allow a user to access specific areas of a form or individual forms by confirming that the user is in fact qualified to complete that section, i.e. that they have a security level associated equating to a security level associated with the form or section of a form.

In one embodiment, the security module is implemented using software routines, which authenticate the user against a user name and password stored locally on the data collection device. Users may not be allowed access to the forms until valid user identification and password combination has been supplied. Additionally, every time a user wishes to electronically sign a section (signature a requirement) as part of a form, they may first be re-authenticated to determine whether they are authorised or qualified to sign that specific section. Other options may also be implemented, for example each user may be provided with a unique digital key which they may insert into the data collection device. The digital key may for example identify the user and their authorisation level. In this option, for example, a digital certificate may be stored locally on the device for each user or each user may be given an individual digital certificate which could be stored on an external piece of hardware which is adapted to interface with the Data Collection Device to provide the digital certificate. Also a user may be authenticated using a Username and Pass Phase, or any combination of the above.

In addition to specifying the qualifications (security level) required of a user in order to complete a specific set of electronic forms, the system may be further adapted to allow a user to perform an action that is equivalent to a pen and ink signature.

One method of performing this signature function is to request re-authentication by users on completion of each section of a form or a complete form. A digital signature may be derived from the supplied identification (e.g. this digital certificate). As stated previously, every time a user wishes to electronically sign a section as part of a form, they may first be required to perform a re-authentication to determine whether they are authorised and/or qualified to sign that specific section.

More broadly speaking, other types of electronic signatures may be used to ensure authentication of users. An electronic signature may comprise one or more of the following, in addition to or in place of the digital signature mentioned above: PINs, user identifications and passwords, digitised signatures and biometric methods.

The security module may be expanded to a full PKCS#11 certificate based trusted Public Key Infrastructure (PKI) infrastructure or similar scheme if required. PKI enables users of an unsecured public network to securely and privately exchange data through the use of a public and a private cryptographic key pair that is obtained and shared through a trusted authority. The public key infrastructure provides for a digital certificate that can identify individual or organisation and directory services that can store and, when necessary, revoke the certificates.

The public key infrastructure assumes the use of public key cryptography, which is the most common method on the Internet for authenticating a message sender or encrypting a message. Traditional cryptography has usually involved the creation and sharing of a secret key for the encryption and decryption of messages. This secret or private key system has the significant flaw that if the key is discovered or intercepted by someone else, messages can easily be decrypted. For this reason, public key cryptography and the public key infrastructure is the preferred approach for communications over the Internet.

When a form is completed, the entered data may be uploaded to the data store along with the electronic digital signature as proof that the user is agreeing or consenting to the information entered.

When a form has been completed in full (and signed by the user if required), it may be committed to the data store. This may be done by pressing the "Submit" button or a button with similar functionality. The individual forms may be uploaded individually or in a batch.

In one embodiment, when all forms have been completed by the required persons, the Captain of the aircraft may be required to enter his\her approval and sign-off on the entered data, believing all of the data that is to be uploaded to be complete and true.

Once the Captain's approval has been provided, the data from the data collection device 2 may be transmitted via the communications network 4 to the server 5.

A purpose of the present invention is to replace the current paper based aircraft technical log and defect report forms. However, Joint Aviation Authorities (JAA) regulations require that a copy of this information be submitted at each port of call in case of an accident in flight. Accordingly, a fundamental requirement exists for the collection device to have the facility to be able to store the information in a remote repository (i.e. away from the aircraft).

One of the key requirements for JAA is that a copy of the Aircraft Technical log for the previous journey be removed from the aircraft prior to the aircraft's next flight. This is to ensure that a record of any possible faults is available in the event that an aircraft crashes. Uploading the data from the data collection device 2 to the server 5 meets this requirement under normal circumstances.

In certain instances, communications between the data collection device and the server 5 may not be possible, e.g. a communications/network failure. In these circumstances, it would ordinarily be necessary to complete a paper copy of the aircraft tech log before the aircraft could take off. This would be a severe inconvenience and in most cases impracticable as the communications problem may only manifest itself after all the necessary actions have been completed and the personal involved have left. To prevent this happening, the data collection device is preferably provided with a removable storage device, e.g. a floppy disk, pen drive, dongle or PCMIA memory card slot. The data to be uploaded may be stored on the removable storage device in the event of a communication failure. The removable storage device may then be removed from the data collection device. The storage device may then be removed from the aircraft and sent by conventional means back to the aircraft operator for uploading. In this way, an aircraft is not prevented from departing because of a communications, network or server failure.

Figure 4:
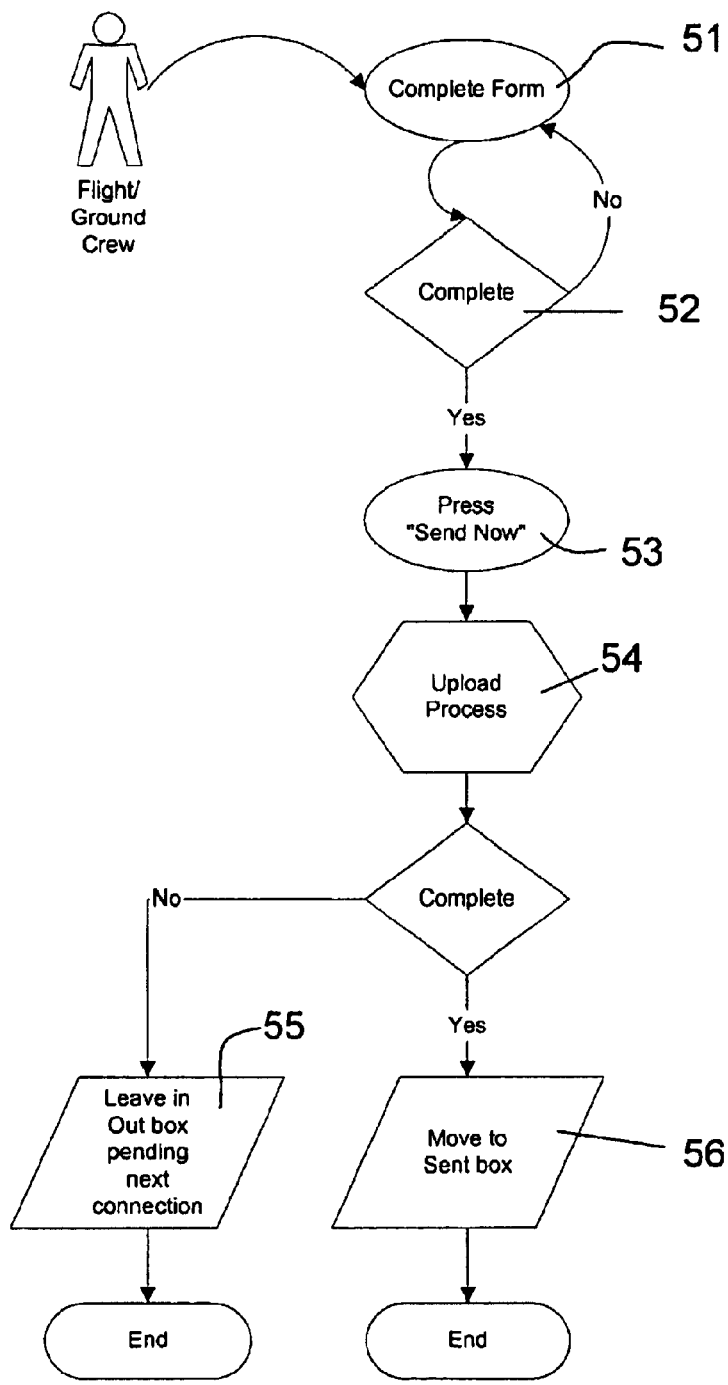
FIG. 4 is an exemplary upload process according to the invention.

Accordingly, there may be three operational modes for the data collection device:

1) Save the collected data locally on the memory device (i.e. hard drive).
2) Upload the collected data to the datastore on the server (via one or more of the communications mediums discussed herein).
3) Save the collected data to a removable storage device An exemplary upload process 50, as shown in FIG. 4, commences with the completion of the entry of data 51. Final responsibility for the airworthiness of the aircraft lies with the Captain of the aircraft. For this reason, the Captain's signature of the acceptance form may be used to identify when all of the forms have been completed satisfactorily 52. This completion will trigger the uploading to the server. The user may be prompted 53 to commence an upload. At this stage, all of the saved (XML) documents detailing user entered details will be sent 54 to the Server. The fact that the components of an entire aircraft XML document are in separate files is not important as the XML include keyword may be used to aggregate the XML data files.

Upon selection of the option to upload data, a connection is established over the communication network with the server. Security may be implemented using basic HTTP authentication, which is commonly used for remote data access and for protecting web sites. More advanced security may be implemented if required.

Communication between the PC or PDA device 2 and the server 5 may be performed using the HTTP protocol running over a TCP/IP connection onto a public switched telephone network. The communications channel may or may not be secured by encrypting the data packets for the transmission. This encryption may be implemented for example using triple Data Encryption Standard (DES) encryption. DES is a widely-used method of data encryption using a private (secret) key that was judged so difficult to break by the U.S. government that it was restricted for exportation to other countries. DES applies a 56-bit key to each 64-bit block of data. The process can run in several modes and involves 16 rounds or operations. Although this is considered "strong" encryption, many companies use "triple DES", which applies three keys in succession. If a connection can not be established, the XML data will remain 55 in the out directory that acts as a "First In First Out" type queue waiting until the next successful network connection to the server 5. If deemed necessary, messages and documents may be assigned a unique communications ID to ensure continuity and reliability of the data being sent. A copy of successfully uploaded files may be stored 56 locally on the data collection device, e.g. in a sent box (folder).

The Web server may confirm the validity of the XML data by comparing a message digest or digital signature calculated locally with the digest or digital signature generated by the Off-line Storage support module that is sent as part of the XML user data.

When the XML data arrives at the server, the digital signature may be validated to confirm the authenticity of the user before the XML data will be saved in the server data store. If the signature is not known to the system the data will not be saved in the data store. Instead, a message will be returned from the server to the user of the data collection or data transmission device that the digital signature was not validated.

In another embodiment, the concept of biometrics may be used as a means to achieving a higher degree of authentication. Biometrics refers to technologies for measuring and analysing human body characteristics such as fingerprints, eye retinas and irises, voice patterns, facial patterns, and hand measurements, especially for authentication purposes. Such Biometrics may be used as replacements for or in addition to the use of computer passwords and other security features.

Fingerprint and other biometric devices consist of a reader or scanning device, software that converts the scanned information into digital form, and wherever the data is to be analysed, a database that stores the biometric data for comparison with previous records. When converting the biometric input, the software identifies specific points of data as match points. The match points are processed using an algorithm into a value that can be compared with biometric data scanned when a user tries to gain access.

Fingerprint, facial, or other biometric data can be placed on a smart card and users can present both the smartcard and their fingerprints or faces for an extra degree of authentication.

Under the JAR-145 regulations, a copy of the aircraft technical log information must be submitted at each port of call. However, in the event where there is no network coverage for reasons of location or a fault, the data collection device must be able to provide a copy of the information by storing the data on an external device that can be removed from the aircraft before take-off as previously described.

The server data store comprises a central repository for all submitted aircraft technical logs and associated defect reports and/or a plurality of other general flight operations and administrative data as previously described.

To ensure that the system maintains a characteristic open, standards based, scaleable architecture, all interfaces to the data contained in the repository are preferably XML/HTML based running over the HTTP protocol. The interface to the data store may however be by different channels, such as Open Database Connectivity (ODBC) or Java Database Connectivity (JDBC). By using ODBC statements in a program, files may be accessed in a number of different databases. JDBC is an application program interface (API) specification for connecting programs written in Java to the data in popular databases. With a small "bridge" program, the JDBC interface may be used to access databases through the ODBC interface.

In one embodiment, there may be two primary interfaces to the data store of the server, namely a Data Collection interface 6 and a remote data access interface 8.

The Data Collection Interface 6 enables PCs or PDA's to upload information to & download information from the data store. Aircraft technical logs, deferred defect reports and other flight operational data may be submitted using for example, HTTP, to the Data Collection Interface of the server. The Data Collection Interface may then load the data into the data store.

The Remote Data Access Interface 8 enables clients with network access, e.g. via the internet, to access the data store of the server. For example, the client sites may access their data contained in the repository using a JSP enabled web interface. The client interface may use Java Server Pages and Java Beans to achieve maximum scalability while maintaining a discreet boundary between the presentation of the data (for example, HTML or XML) and the data store 7.

The Remote Data Access interface may be provided, for example, to allow customers to perform data analysis and mining etc. Optionally, this may for example be implemented as a web and/or WAP accessible interface, but is not limited to these forms of interface.

The data upload component 6 will now be described in greater detail with reference to an exemplary embodiment. The data transaction performed by this component is an XML encoding of the information entered by users in forms along with actual contextual information of the form itself. This will allow the system to reconstitute the actual form, including the data entered on it, which is understood to be a requirement for legal reasons.

The data arrives at the upload component 6 as a result of a user successfully and correctly completing a form or set of forms, digitally signing the data as being completed by or reviewed and accepted by them and pressing the "Submit" button or a button with similar functionality. The user interface component on the data collection device will then add a digital signature to the information to ensure data integrity before finally sending the information to the data upload component. In one embodiment, a Message Digest 5 (MD5) digest may be added to the information to ensure data integrity as described above. MD5 is an algorithm developed by RSA Security Inc. in 1991 for digital signature applications. The algorithm takes as input a message of arbitrary length and produces as output a 128-bit "fingerprint" or "message digest" of the input. It is conjectured that it is computationally infeasible to produce two messages having the same message digest, or to produce any message having a given prespecified target message digest. The MD5 algorithm is intended for digital signature applications, where a large file must be "compressed" in a secure manner before being encrypted with a private (secret) key under a public-key cryptosystem such as RSA. The MD5 algorithm is designed to be quite fast on 32-bit machines. In addition, the MD5 algorithm does not require any large substitution tables ensuring that the algorithm can be coded quite compactly.

Communications between the data collection device and the upload component is by means of HTTP over Transmission Control Protocol/Internet Protocol (TCP/IP) to connect to the web server that forms the major part of this particular component.

As stated previously, the data is sent to the server 5 using a HTTP PUT or POST request method, so on arrival 60 the web server 5 will be able to read the data from it's standard input stream. The data is checked to determine whether it is intended for the data upload module. The data is then passed to the XML Gateway Server 61 of the data upload module. XML data is extracted 63 from the HTTP request body. A copy of the extracted data is stored to a temp directory 64. The digital signature is checked and confirmed 65. The file is then split 66 into sub-XML files as required. The data from these files is then loaded 67 to the data store. The transmission audit information is then logged 68. An acknowledgment 69 is also sent to the client device. If any of the above steps fail, a NAK (Not Acknowledged) message is sent 70 to the client indicating a failure. Upon completion, the HTTP connection is closed.

The XML Gateway Server referred to above acts as the connection between off-line modules of data collection devices used by the clients, and the back office systems, e.g. the data store of the server, with reference to the above procedure. The Gateway will confirm the validity of the XML data by comparing a message digest or a digital signature calculated locally with that sent as part of the XML user data. In the event where these digest or digital signature values do not match, the system will assume that the communications channel has corrupted the XML data and will inform the user while performing a rollback operation of the queue. In further embodiments, the validity of the XML data may also be confirmed by using a variety of other procedures, but based on the same principles. The structure of the XML document may be verified against the XML document schema or XML DTD Document.

Finally, the digital signature of the user of the form will be validated and the XML data will be saved in the Invention data store via the data integration service. If the signature is not known to the system the data will not be saved in the data store and the system will inform the user, while performing a rollback operation of the queue.

Once the forms have been validated they are passed onto an XML aware data integration service for transferring to the data store.

The remote data access module 8 allows users to perform queries on the data store 7. Remote data access may be implemented using a web based HTTP interface to the data store, and may for example allow aircraft operators to perform queries and generate reports on the operational and maintenance data of aircraft whose data is maintained by the system.

The user interface could for example be a collection of HTML and/or XML based forms that could allow a user to enter information relevant to the search they wish to perform. In this example the forms will be constructed using JavaServer Pages technology that uses XML like tags and scriptlets written in Java to encapsulate the logic that generates the content for the page. The query logic is separated so that it resides in a collection of Java components that the HTML and/or XML forms can access. By separating the page logic from its design and display and supporting a reusable component-based design, it allows for faster and easier expansion of the available range of queries. A set of standard user interfaces may be designed, but these may also be customised to suit each specific additional user requirement.

In one embodiment, messages and document layouts may be based on, for example, XML templates which allow flexibility when designing the structure and content of messages and documents.

Implementing basic HTTP user level authentication may provide security for this component. Web based basic HTTP authentication denies web access to users who do not give a valid username and password. This authentication method is a standard method used by webmasters to restrict access to certain directories. The user names and passwords are stored in a similar manor to that of a standard UNIX passwd file. Passwords in basic HTTP authentication are base 64 encoded between the client and the web server.

Figure 5:
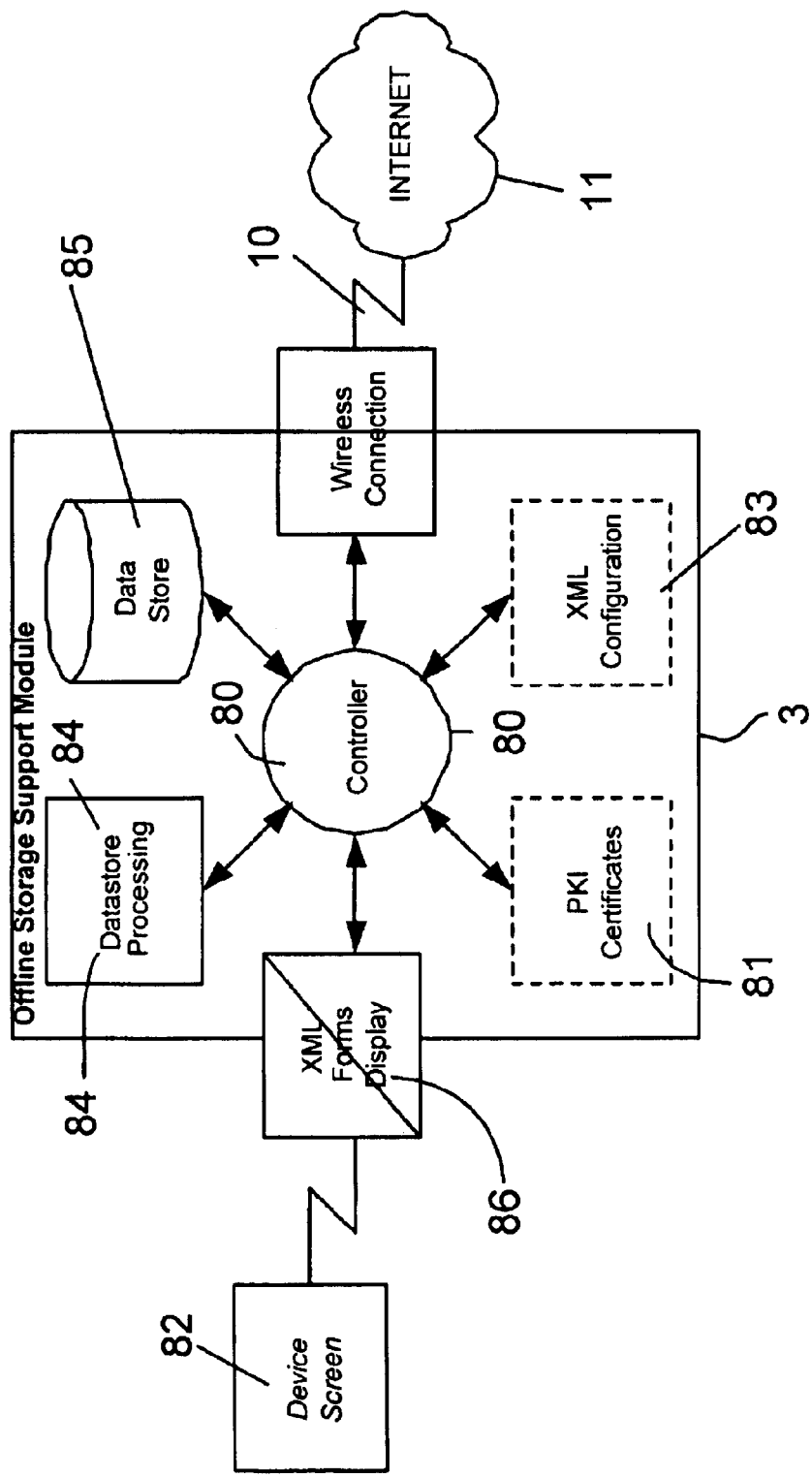
FIG. 5 is a schematic representation of (Data Collection/Retrieval) the Off-line Storage Support Module as used in the present invention, and FIGS. 6A and 6B describe the upload process of the invention at the server.

The data collection component on the data collection device is implemented using the previously described Off-line storage support module which holds a lot of the individual business rules of the particular implementation. An exemplary architecture for the off-line storage support module is shown in FIG. 5.

In this embodiment, the Off-line Storage Support Module 3 is a security proxy service sitting between the Display Engine or "Device Screen" 82 and the Internet. As an independent application it allows integration with software available on the system.

The main component of the Off-line Storage Support Module 3 is the controlling module or simply the "Controller" 80. This module is the central software component responsible for integrating with the other required components and contains the business process logic applicable to the project. The controlling module may integrate all the major elements available to the display device e.g. cryptography, digital signing, document object model and XML data representation. Due to the off-line requirement, persistence of state between instances of business data is essential, i.e. local storage is required. To achieve this functionality, modules and/or files may be required to perform XML configuration 83, data store processing 84, data storage 85, and PKI processing 81.

Local storage may involve the use of XML open standard meta-data format; due to its readability, extensibility and wide enterprise acceptance as a data model. Combined with the ability to query and process XML using XSLT the system is capable of full CRUD (create/read/update/delete) functionality making it a database system. The Off-line Storage Support module may also contain encryption and digital signature security functionality and integration with for example Universal Serial Bus (USB) tokens containing the user's public and private encryption keys conforming to the PKCS#11 standard or a similar standard.

The XML software interface may comprise a three-tier architecture local to the data collection device providing an open flexible system. The primary advantage to this approach is that the presentation layer is provided by a display device or "device screen" 82 running on the data collection device 2 and since the user interface is preferably defined in HTML or XML, it may be customised easily allowing maximum flexibility and reduced development cycles for the user interface.

The method of data entry will now be described in greater detail with reference to a document-type definition which describes the entire aircraft engineering information. In use, the flight crew and ground crew personnel complete sub-forms that map to parts of this entire document-type definition.

The users each fill out only those sub-forms that they are permitted to under JAR-OPS regulations. When the individual sub-forms are each complete, the Captain may be permitted to review the information and sign the overall process using for example, a user name and password combination.

The Captain may review all of the sub-forms completed by the various other actors in the process.

A user may view these sub-forms using the interface provided. The Captain may then sign the form and press the "Submit" button or a button of similar functionality. All of the sub-forms as represented by multiple XML documents are sent to the back-end system. The aggregation of these components of the entire aircraft XML document while contained in the separate files will be achieved using the XML include keyword.

Aircraft technical data and/or flight operational data may be stored 85 as a hierarchical collection of compressed (client configurable) XML files in a working folder under the local root directory. On completion of the technical log and/or other operational forms, an aggregate XML file containing the information captured may be stored in the Off-line outbox which forms the FIFO queue of the data collection system.

Exemplary data folders and their intended contents are set out in Table 2.

TABLE 2

| Folder | Description |
| --- | --- |
| Outbox | Aggregate XML data is stored until sent it to the server. |
| Sent | A copy of all XML data that has been sent to the server. |
| Current | Data collected by the data collection device may be stored here until all sections have been completed and have been aggregated successfully. |

From a maintenance perspective, a number of rules and assumptions are made in implementing the data collection interface. These assumptions are as follows:

Every defect will have an associated action and an optional carried forward (sometimes referred to as a "deferred") defect.

Every carried forward defect preferably will have an associated defect action and one or more optional update actions on the defect.

Update actions may only be raised as a result of a carried forward defect.

When submitting a carried forward defect, the client system may need to provide the server with the original associated aircraft technical log number and original defect number from where the defect was raised. This will allow a reference to be added to the carried forward defect providing a reverse linkage to the original defect.

Accordingly, these details should be maintained in the carried forward defect XML file stored on the client.

When submitting a base for example, a deferred defect, the client system may need to provide the server with the original associated aircraft technical log number and original defect number from where the defect was raised. This will allow a reference to be added to the base deferred defect to provide reverse linkage to the original defect and to the carried forward defect. Similarly, these should be maintained in details for example, a base deferred defect XML file stored on the client.

When submitting a defect action, the client system needs to provide the back-end with the type of defect to which the action relates (e.g. defect, carried forward defect or base deferred defect), and the original associated aircraft technical log number and original defect number from where the defect was raised. This combination will allow a reference to be added to the defect action to provide a reverse linkage to the defect, carried forward defect or base deferred defect to which the action relates.

A major function of the user interface of the data collection device is to allow the entry of data corresponding to previous paper forms. Paper based technical log and defect reporting forms for aircraft may include, but are not limited to the inclusion of the elements as shown in Table 3.

TABLE 3

Technical Log and Defect Reporting Components

| Reference Number | Title |
| --- | --- |
| A | Aircraft Technical Log |
| B | Carried Forward Defect Record |
| C | Base Deferred Defect Log |
| D | Terminal Check Log Sheet |
| E | Check Log Sheet |

Table 4 illustrates an exemplary Voyage Report, whereby the entry of data in electronic format is facilitated, by entry in the fields provided. Although there may be a general requirement to complete each field of the form for validation purposes, in the case of the voyage report, there may be less than the provided number of legs in the voyage, and therefore the business rules may need to be adjusted to allow for empty fields. The fields may be populated by selecting from a dropdown menu and/or user input from a keyboard, depending on system specifications.

TABLE 4

Voyage Report

| Airline X | Voyage Report | | | | | A/C Registration Date: | | | |
| --- | --- | --- | --- | --- | --- | --- | --- | --- | --- |
| Leg Nr. | Flight Nr. | STD UTC | STA UTC | Off Block UTC | Airborne UTC | Touchdown UTC | On Blocks UTC | TIME | PAX Info |
| 1 | | | | | | | | | |
| 2 | | | | | | | | | |
| 3 | | | | | | | | | |
| 4 | | | | | | | | | |
| 5 | | | | | | | | | |

Table 5 shows a simplified exemplary Fuel Management Form, as may be included in the invention. As discussed in this document, fuel records may be better managed and more accurately entered by using the data collection process enabled by the Invention.

TABLE 5

Basic Fuel Management Sample Form

Fuel

| Leg Nr. | Actual Total Fuel in tanks (kg) | Estimated Total Fuel in tanks (kg) | Landing Fuel (kg) | Estimated Burn-Off | Tankering (kg) |
| --- | --- | --- | --- | --- | --- |
| 1 | | | | | |
| 2 | | | | | |
| 3 | | | | | |
| 4 | | | | | |
| 5 | | | | | |

Table 6 shows an example of a form—again based on existing paper-based standards—which may be used to indicate the crew members taking part in a voyage.

TABLE 6

Basic Crew Member Details Form

| Crew Members Position | Name | Legs not done |
| --- | --- | --- |
| Captain | | |
| Captain | | |
| First Officer | | |
| First Officer | | |
| Auxiliary | | |
| Auxiliary | | |
| Auxiliary | | |
| Insp | | |
| Insp | | |
| Insp | | |

TABLE 7

Basic Content of a Ground Services Form

Ground Services

Ground Power Unit
Avionics Switching Unit
Steps on Departure
Steps on Arrival
Bus on Departure
Bus on Arrival
Fire Brigade
De-icing
Seating
Wheelchair on Departure Table 7 shows a basic example of a form used to record information with regard to services that may be performed on the ground, rather than on the actual aircraft. It may be just as important to record this data as accurately as flight technical and/or operational data, and by use of the data collection device of the invention, this gathering of data may be done quickly and easily.

TABLE 8

Exemplary Weight and Balance Sheet

Weight and Balance Sheet

Flight Number
A/C Registration
Captain
From
To
Date
Leg number

|  | Head Count | Est. Weight |  |
| --- | --- | --- | --- |
| Adults (at average 70 kg each) |  |  |  |
| Children (at average 30 kg each) | + |  |  |
| TOTAL PAX | = |  |  |

|  | Luggage Count | Est. Weight |  |
| --- | --- | --- | --- |
| FWD Hold | + |  |  |
| AFT Hold | + |  |  |
| TOTAL TRAFFIC LOAD | = |  |  |
| DRY OPERATING WEIGHT | + |  |  |
| LMC - Weight | Actual ZFW | = | Max ZFW |
|  | Take-Off Fuel | + |  |
|  | Actual TOW | = | Max TOW |
|  | Trip Fuel | − |  |
| LMC TOTAL | Estimated LW | = | Max LW |

Table 8 shows a basic example of a form used to record weight and balance information. By use of the data collection device of the Invention, this gathering of data may again be done quickly, easily and accurately. As discussed with regard to Weight/Load and Balance above, the invention may also be used to plot graphs based on the information entered by a user.

Figure 6A:
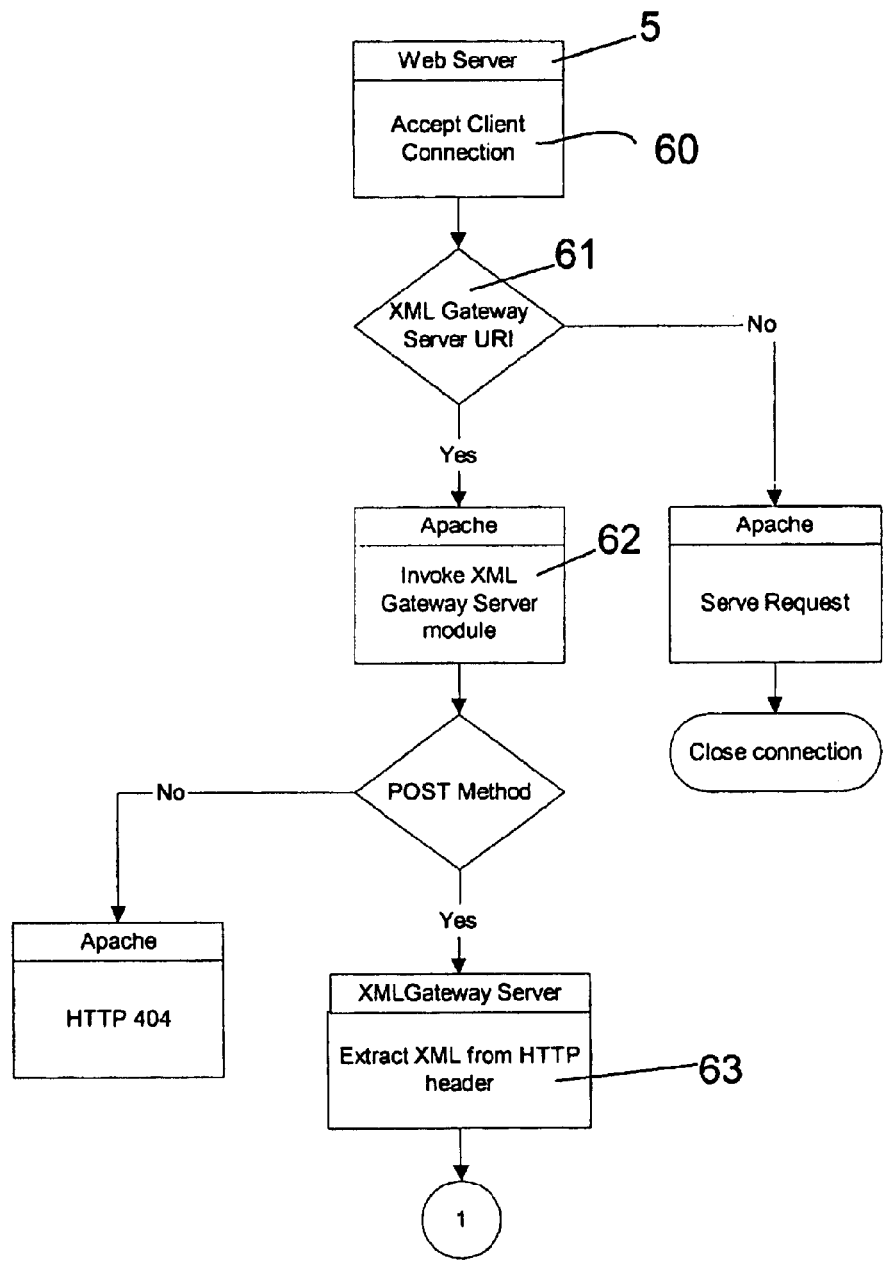
Figure 6B:
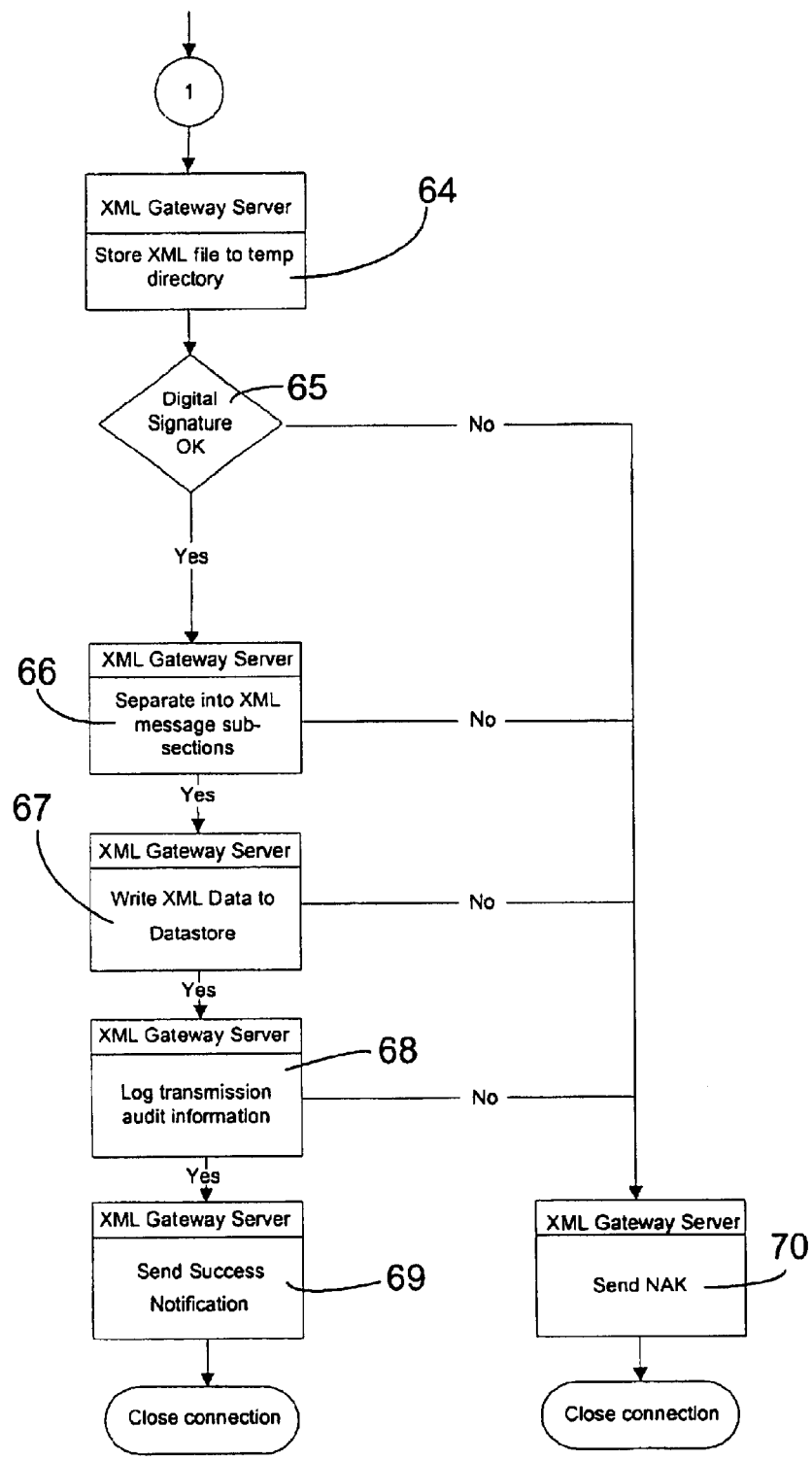

The actual data upload process to the server will now be described in greater detail and with reference to FIGS. 6A and 6B. The XML Gateway Server may run as a CGI application on a web server and act as the gateway between the Off-line Module on the client end and the data store systems on the back end. When the Captain completes and signs the acceptance form, the data is sent to the servers.

The server receives a HTTP connection 60 with a POST or PUT request from the data collection device for a URL that is configured to invoke 62 the XML Gateway. The encrypted XML file or message is extracted 63 from the HTTP POST/PUT request body and a copy is placed 64 directly in a temporary directory. The Digital Signature 65 is checked and validated. The file is then split into sub-XML files 66. The XML data may then be sent as clear text to a remote data integration service over a TCP/IP socket for loading in the data store 67. The transmission audit information is then logged 68. If these steps are successful an ACK signal may be sent 69 to the client confirm success of the upload, whereas a NAK signal may be sent 70 to indicate failure of one or more of the steps. The HTTP connection may then be closed. If any of the above steps fail, a NAK (Not Acknowledged) message is sent 70 to the client indicating a failure. Upon completion, the HTTP connection is closed.

A fundamental requirement of the data upload system is to provide end to end tractability and error reporting back to the client that initiated the process in a clear and visual user friendly way. The user that initiates the process should be made aware not only of successful upload but also of all possible failures. This end-to-end tractability should provide a round trip report from the data collection device right through to the data store on the back-end of the system.

The digital signature will be validated and the XML data will be saved in the data store via the data integration service. If the signature is not known to the system the data will not be saved in the data store and the system will inform the user, while performing a rollback operation of the queue.

Data integration begins when the XML Gateway Server decodes the XML document, confirms and validates the signatures present in the XML data. It is then necessary to take this unencrypted XML data and store it in the database. The words "comprises/comprising" and the words "having/including" when used herein with reference to the present invention are used to specify the presence of stated features, integers, steps or components but does not preclude the presence or addition of one or more other features, integers, steps, components or groups thereof.

We claim:

1. An aircraft data collection device for use by a plurality of users, each of the users having an associated security level, the data collection device comprising:

a security feature for identifying a user and determining their associated security level, a user interface comprising a first series of list menus which are populated with items identifying sections and/or systems of an aircraft which may be selected by a user and wherein upon selection of a section or system of an aircraft, the user is presented with a subsequent list menu identifying a list of predetermined problems associated with the selected section or system of the aircraft, the user interface adapted to obtain technical and/or operational data associated with an aircraft flight cycle, from one or more of the plurality of users, each item of technical and/or operational data having an associated security level, wherein the user interface is adapted to only accept an item of data from a user when the authorisation level of the user at least matches the authorisation level of the item of technical and/or operational data.

2. The data collection device of claim 1, further comprising at least one communication feature for communicating entered aircraft technical and/or operational data to an external datastore.

3. The data collection device of claim 2, wherein at least one communication feature comprises a wireless connection terminal or modem for connecting to a network to enable entered aircraft data to be uploaded to the external datastore.

4. The data collection device of claim 2, wherein at least one communication feature comprises a memory writer adapted to store data on a removable memory device.

5. A data collection device according to claim 2 wherein the user interface is adapted to display data previously entered by users and/or data received via the communications feature.

6. The data collection device of claim 5, wherein the user interface is further adapted to only display data to users having a security level associated with the data to be displayed.

7. A data collection device according to claim 1, further comprising an authorisation feature which is adapted to prevent the communication of data to the datastore until data has been entered for a number of pre-determined sections.

8. The data collection device of claim 7, wherein the authorisation feature is adapted to prevent entry of data corresponding to a subsequent aircraft cycle until entered aircraft data associated with the previous cycle has been communicated to an external datastore.

9. A data collection device according to claim 1, wherein the user interface further comprises a defect reporting system, said defect reporting system comprising:
  a menu generation feature for generating a hierarchical series of menus,
  a datastore containing an aircraft parts definition wherein each part of the definition is either a sub-part or contains one or more sub-parts,
  wherein upon receipt of a selection from the user input means, the menu generation feature generates a menu containing a list of parts of the definition which are identified in the datastore as sub-parts of the user selection.

10. A data collection device according to claim 9, the datastore also contains possible faults associated with individual parts and wherein upon selection by a user of a part from a menu not having a sub-part stored on the datastore, the menu generation feature generates a menu from the datastore listing possible faults associated with the selected part.

11. A data collection device according to claim 10, wherein the datastore stores an associated code for each part and each fault.

12. A data collection device according to claim 11, wherein the user selection feature generates an output identifying the part and fault by their respective associated codes.

13. An aircraft data collection device according to claim 1, wherein the user interface is adapted to provide a series of list menus which are populated with aircraft-related options selectable by a user.

14. A method of collecting aircraft data from a plurality of users, each of the users having an associated security level, the method comprising:
  identifying a user and determining the user's associated security level,
  obtaining data associated with an aircraft flight cycle, from the user, each item of data having an associated security level wherein the entering of data corresponding to a subsequent aircraft cycle is prevented until entered aircraft data associated with the previous cycle has been transmitted to an external datastore or device, and
  wherein the step of obtaining data from the user is performed only when the user has an authorisation level at least matching the authorisation level of the item of data.

15. The method of collecting aircraft data according to claim 14, further comprising the step of communicating entered aircraft data to an external database.

16. The method of collecting aircraft data according to claim 15, wherein the step of communicating entered aircraft data to an external datastore comprises the steps of connecting to a network and uploading entered aircraft data to a datastore on a remote server.

17. The method of collecting aircraft data according to claim 16, wherein the step of communicating entered aircraft data to an external datastore comprises storing the aircraft data on a removable memory device.

18. A method of collecting aircraft data according to claim 17, further comprising the option of displaying data previously entered by users and/or data received.

19. A method of collecting aircraft data according to claim 18, in which the displaying of data may be restricted to users having a security level associated with the data to be displayed.

20. A method of collecting aircraft data according to claim 14, wherein the step of uploading data to an external datastore may be inhibited until data has been entered for a number of pre-determined sections.

21. A method of collecting aircraft data according to claim 14 further comprising the provision of a user interface comprising a first series of list menus which may be populated with items identifying sections or systems of an aircraft which may be selected by a user and wherein upon selection of a section of system of an aircraft, the user is presented with a subsequent list menu identifying a list of predetermined problems associated with the selected section or system of the aircraft.

22. A method of collecting aircraft data according to claim 14, further comprising a method of defect reporting comprising the steps of generating a menu in a hierarchical series of menus from a datastore containing an aircraft parts definition wherein each part of the definition is either a sub-part or contains one or more sub-parts, upon receipt of a selection from the user, the generated menu containing a list of parts of the definition which are identified in the datastore as sub-parts of the user selection.

23. The method of collecting aircraft data according to claim 22, further comprising the step of storing possible faults in the datastore, and associating faults with parts and wherein upon selection by a user of a part from a menu which has no sub-parts stored on the database, generating a menu comprising a list of possible faults associated with the selected part.

24. The method of collecting aircraft data according to claim 23, comprising the step of associating a code with each part and possible fault, wherein the generation of data concerning a part fault identifies the part and fault by their respective codes.

25. The method of collecting aircraft data according to claim 24, wherein each part may be identified by its code plus the code of the part of which it is a subpart.

26. The method of collecting aircraft data according to claim 25, comprising the step of providing a series of list menus which are populated with aircraft-related options selectable by a user.

27. An aircraft data collection device for use by a plurality of users, each of the users having an associated security level, the data collection device comprising:
- a security means for identifying a user and determining their associated security level, a user interface means adapted to obtain technical and/or operational data associated with an aircraft flight cycle, from one or more of the plurality of users, each item of technical and/or operational data having associated security level wherein the entering of data corresponding to a subsequent aircraft cycle is prevented until aircraft data associated with the previous cycle has been transmitted to the external datastore, and,
- wherein the user interface means is adapted to only accept an item of data from a user when the authorisation level of the user at least matches the authorisation level of the item of technical and/or operational data and communication means for communicating entered aircraft technical and/or operational data to an external datastore.

* * * * *